US006980776B2

(12) United States Patent
Shimada et al.

(10) Patent No.: US 6,980,776 B2
(45) Date of Patent: Dec. 27, 2005

(54) TRANSCEIVER APPARATUS

(75) Inventors: Yoshikazu Shimada, Kyoto (JP); Hiroyuki Ashida, Kyoto (JP); Katsuya Ogura, Kyoto (JP); Sadao Igarashi, Kawasaki (JP)

(73) Assignees: Rohm Co., Ltd, Kyoto (JP); RF Chips Technology Inc., Kawasaki (JP)

( * ) Notice: Subject to any disclaimer, the term of this patent is extended or adjusted under 35 U.S.C. 154(b) by 562 days.

(21) Appl. No.: 10/309,344

(22) Filed: Dec. 4, 2002

(65) Prior Publication Data
US 2003/0124987 A1 Jul. 3, 2003

(30) Foreign Application Priority Data
Dec. 5, 2001 (JP) .............................. 2001-371434

(51) Int. Cl.[7] .............................................. H04B 1/44
(52) U.S. Cl. ........................... 455/83; 455/78; 455/79; 455/80; 455/81; 455/82; 455/83; 455/84; 455/85; 455/86; 455/87; 455/120; 455/121; 455/122; 455/123; 455/124; 455/125; 333/100; 333/101; 333/103
(58) Field of Search .................... 455/78–87, 120–125; 333/100, 101, 103

(56) References Cited

U.S. PATENT DOCUMENTS

| | | | |
|---|---|---|---|
| 4,677,688 A * | 6/1987 | Yoshihara et al. ............ 455/82 |
| 4,803,447 A * | 2/1989 | Schultz et al. .............. 333/103 |
| 5,697,069 A * | 12/1997 | Bohm et al. .................. 455/83 |
| 5,789,995 A * | 8/1998 | Minasi ....................... 333/103 |
| 6,118,985 A * | 9/2000 | Kawakyu et al. ............. 455/78 |
| 6,288,620 B1 * | 9/2001 | Atokawa et al. ............ 333/103 |
| 6,332,071 B1 * | 12/2001 | Brandt ........................ 455/82 |
| 6,633,206 B1 * | 10/2003 | Kato ........................... 333/104 |
| 6,704,550 B1 * | 3/2004 | Kohama et al. .......... 455/114.2 |
| 6,721,544 B1 * | 4/2004 | Franca-Neto ................. 455/83 |
| 6,862,436 B2 * | 3/2005 | Hayakawa et al. .......... 455/121 |
| 2004/0192230 A1 * | 9/2004 | Franca-Neto ................ 455/101 |

* cited by examiner

*Primary Examiner*—Nick Corsaro
*Assistant Examiner*—Minh Dao
(74) *Attorney, Agent, or Firm*—Morgan, Lewis & Bockius LLP

(57) ABSTRACT

The present invention provides a transceiver apparatus that permits miniaturization even when the antenna thereof is an unbalanced circuit and the transmitter circuit section and receiver circuit section thereof are balanced circuits.

The transceiver apparatus is constituted comprising: a semiconductor integrated circuit device that mounts on the same semiconductor chip a balanced receiver circuit 41 for receiving a received signal as a differential input and balanced transmitter circuit 52 for outputting a transmitted signal as a differential output, and that has at least two terminals 71,72 connected to connecting nodes that connect the balanced receiver circuit 41 and the balanced transmitter circuit 52; first and second capacitors C2,C3 connected to the terminals 71, 72 respectively; an external inductor L1 connected to the first and second capacitors C2, C3; a band pass filter 2 and an antenna 1 coupled to the first capacitor C2; and a third capacitor C1 connected to the second capacitor C3.

4 Claims, 3 Drawing Sheets

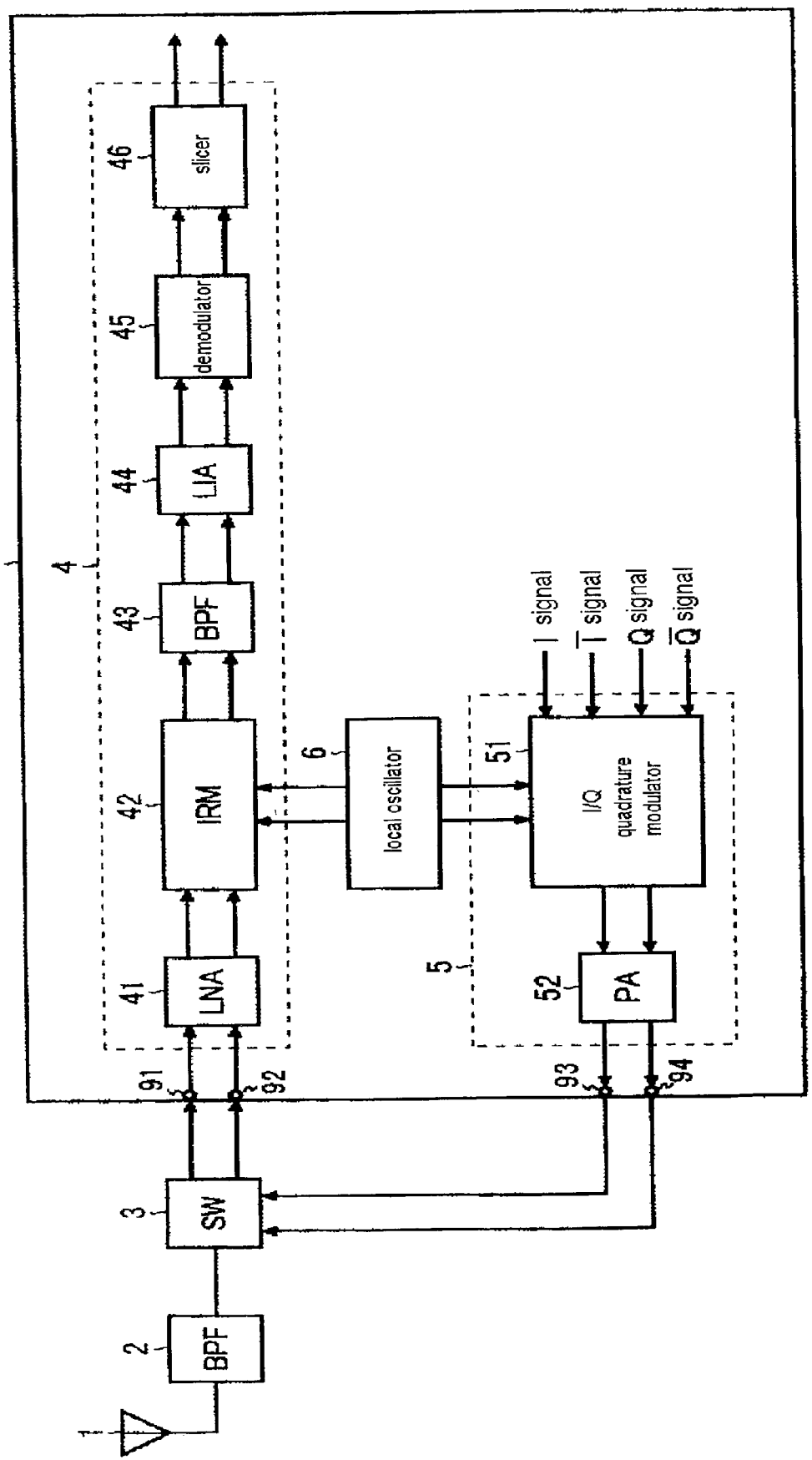

TRANSCEIVER APPARATUS

BACKGROUND OF THE INVENTION

1. Field of the Invention

The present invention relates to a transceiver apparatus, and more particularly to a transceiver apparatus in which a transmitter circuit and a receiver circuit for processing transmitted and received signals respectively are balanced circuits.

2. Description of the Related Art

Transceiver apparatuses often employ a constitution in which the transmitter and receiver circuit sections thereof are balanced circuits. Such a constitution makes it possible to use differentiation to cancel out internal digital noise and the like which is superposed on transmitted and received signals, thereby permitting an improvement in the accuracy of the transmission and reception operations.

A representative constitution of a conventional high frequency signal transceiver apparatus in which the transmitter and receiver circuit sections thereof are balanced circuits is shown in FIG. 3. The conventional high frequency signal transceiver apparatus comprises an antenna 1 for transmitting and receiving digitally modulated high frequency signals, a band pass filter 2 for limiting the transmitted and received signals of the antenna 1 to a predetermined frequency band, a switch circuit 3 for allowing the antenna 1 to be shared by the transmitter and receiver systems; a receiver circuit section 4 and a transmitter circuit section 5 which are connected to the switch circuit 3; and a local oscillator 6 for generating a local signal required in the frequency conversion processing by the circuits 4 and 5.

The receiver circuit section 4, the transmitter circuit section 5 and the local oscillator 6 are mounted in the same semiconductor chip (not shown) in a semiconductor integrated circuit device 9. Further, the semiconductor integrated circuit device 9 comprises a package frame (terminals 91 to 94), part of which protrudes outside the package. The package frame (terminals 91 to 94) is connected within the package to the receiver circuit section 4 or the transmitter circuit section 5 via bonding wire (not shown). The terminals 91 and 92 are terminals for connecting the receiver circuit section 4 to an external component (the switch circuit 3), and the terminals 93 and 94 are terminals for connecting the transmitter circuit section 5 to an external component (the switch circuit 3).

The switch circuit 3 selects either one of the receiver circuit section 4 and the transmitter circuit section 5 to render a state in which the circuit selected and the band pass filter 2 are connected.

The receiver circuit section 4 comprises a low noise amplifier 41 for amplifying the output signal of the switch circuit 3; an image rejection mixer 42 for generating an intermediate frequency signal by mixing the output signal of the low noise amplifier 41 and the local signal of the local oscillator 6, and for removing an image signal from this intermediate frequency signal; a band pass filter 43 for limiting the output signal of the image rejection mixer 42 to within a predetermined frequency band; a limiter amplifier 44 for amplifying the output signal of the band pass filter 43; a demodulator 45 for carrying out demodulation processing on the output signal of the limiter amplifier 44; and a slicer 46 for waveform shaping the output signal of the demodulator 45 and then outputting this signal to an internal circuit (not shown).

On the other hand, the transmitter circuit section 5 comprises an I/Q quadrature modulator 51 for quadrature-modulating the local signal of the local oscillator 6 on the basis of an I signal, an I bar signal, a Q signal and a Q bar signal which are inputted by an internal circuit (not shown); and a variable gain power amplifier 52 for amplifying the output signal of the I/Q quadrature modulator 51 and then transmitting same to the switch circuit 3.

As can be seen from FIG. 3, the antenna 1 and the band pass filter 2 are an unbalanced circuit, and the receiver circuit section 4 and the transmitter circuit section 5 are balanced circuits. A transformer circuit (referred to as a balun hereinafter) must be provided between the unbalanced circuit and the balanced circuits. Consequently, in the conventional high frequency signal transceiver apparatus shown in FIG. 3, a balun function is also added to the switch circuit 3.

The balun must be provided with inductors having a large inductance value, and it is therefore big and difficult to install the balun in the semiconductor integrated circuit device. Consequently, the switch circuit 3 provided with the balun function is an external component rather than being installed in the semiconductor integrated circuit device 9. With a conventional transceiver apparatus, when the transmitter and receiver circuit sections are balanced circuits, the balun is therefore made an external component, which has precluded miniaturization.

Furthermore, the conventional high frequency signal transceiver apparatus shown in FIG. 3 is constituted such that the terminals which connect the receiver circuit section 4 to an external component, and the terminals which connect the transmitter circuit section 5 to an external component are not shared, meaning that the number of terminals provided in the semiconductor integrated circuit device 9 is high, which has made miniaturization impossible.

SUMMARY OF THE INVENTION

In view of the foregoing problems, it is an object of the present invention to provide a transceiver apparatus that permits miniaturization even when the antenna is an unbalanced circuit and the transmitter circuit section and the receiver circuit section are balanced circuits.

In order to achieve the above object, in case that the high frequency signals in or above the GHz band, inductor elements of bonding wire and package frame are utilized as the necessary inductance to high frequency signal transceiver apparatus.

The transceiver apparatus according to an embodiment of the present invention is constituted comprising: a semiconductor integrated circuit device that mounts on the same semiconductor chip a balanced receiver circuit for receiving a received signal as a differential input, a balanced transmitter circuit for outputting a transmitted signal as a differential output and that has two terminals connected to connecting nodes that connect the balanced receiver circuit and the balanced transmitter circuit; first and second capacitors connected to the terminals respectively; an external inductor connected to the first and second capacitors; an band pass filter and an antenna coupled to the first capacitor; and an third capacitor connected to the second capacitor.

A balun is consisted of inductor/capacitor elements, which the bonding wires and the package frame that is coupled via the bonding wires to the semiconductor chip have, capacitor elements, which metal layer patterns between said connecting nodes formed in the semiconductor chip and the bonding wires have, the external inductor, and said first, second and third capacitors.

By this construction, it is possible to reduce the number of terminals of the semiconductor integrated circuit device, and is no longer necessary to provide a big balun as an external component. As a result, it permits miniaturization of the transceiver apparatus.

Furthermore, from the point of view of facilitating impedance matching during transmission, a low noise amplifier for receiving a received signal from the balun as a differential input and which is provided in the balanced receiver circuit is desirably a cascode amplifier.

Furthermore, from the point of view of facilitating impedance matching during reception, a power amplifier for outputting a transmission signal to the balun as a differential output and which is provided in the balanced transmitter circuit is an amplifier whose power feed elements are desirably an inductor and a diode.

BRIEF DESCRIPTION OF THE DRAWINGS

FIG. 3 shows the constitution of a conventional high frequency signal transceiver apparatus.

DESCRIPTION OF THE PREFERRED EMBODIMENTS

Figure 1:
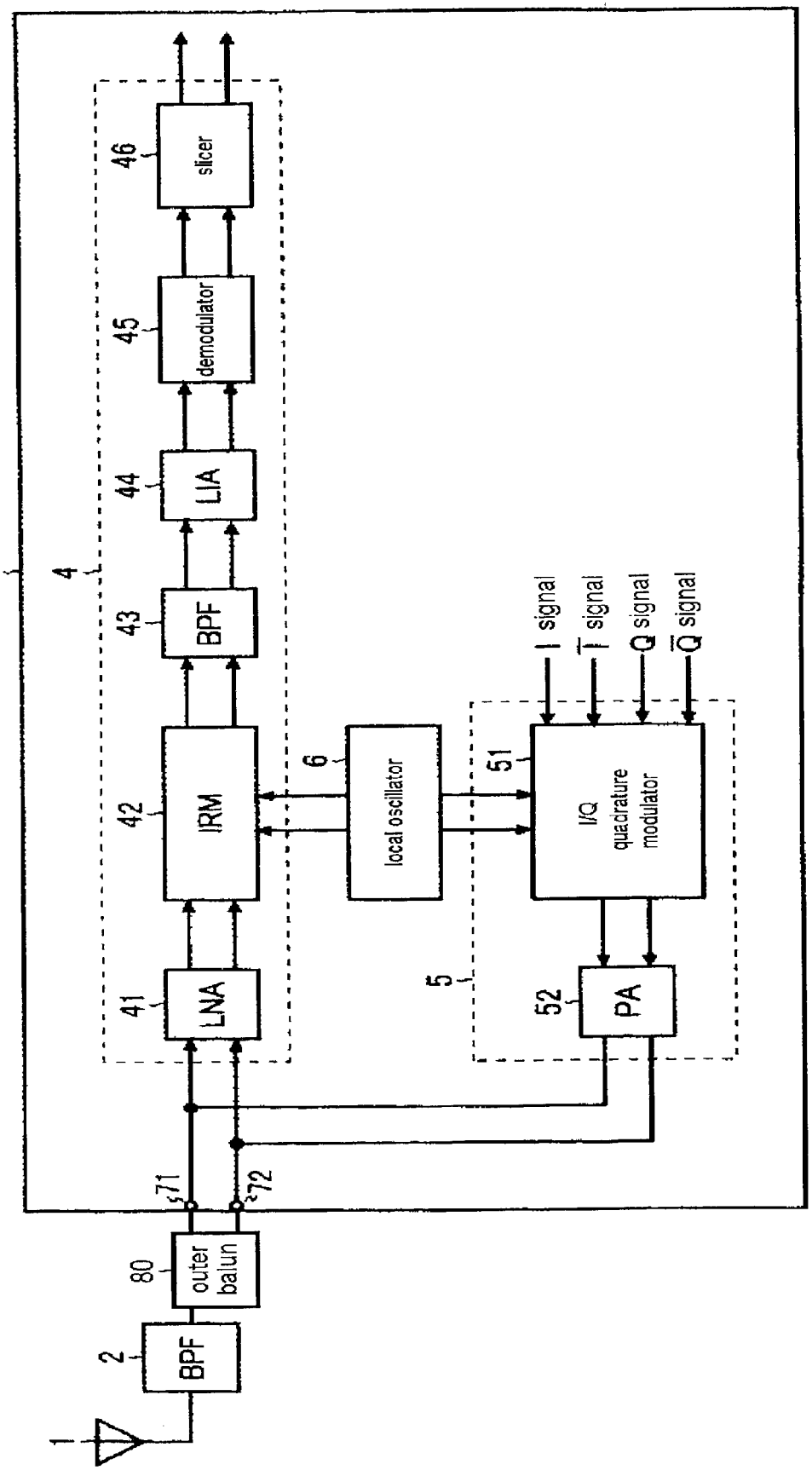
FIG. 1 shows the constitution of an embodiment of the high frequency signal transceiver apparatus according to the present invention.

A description will now be provided for an embodiment of the present invention, with reference to the drawings. The constitution of an embodiment of the high frequency signal transceiver apparatus according to the present invention is shown in FIG. 1. Further, the same reference symbols have been assigned to those components which are the same as those in FIG. 3, and a description thereof is therefore omitted here.

The receiver circuit section 4, the transmitter circuit section 5 and the local oscillator 6 are mounted in the same semiconductor chip (not shown) in a semiconductor integrated circuit device 7. Further, the semiconductor integrated circuit device 7 comprises a package frame (terminals 71 and 72), part of which protrudes outside the package. The package frame (terminals 71 and 72) is connected within the package to the receiver circuit section 4 and the transmitter circuit section 5 via bonding wire (not shown). The terminals 71 and 72 are terminals for connecting the receiver circuit section 4 and the transmitter circuit section 5 respectively to an external part of the balun (outer balun) 80.

Figure 2:
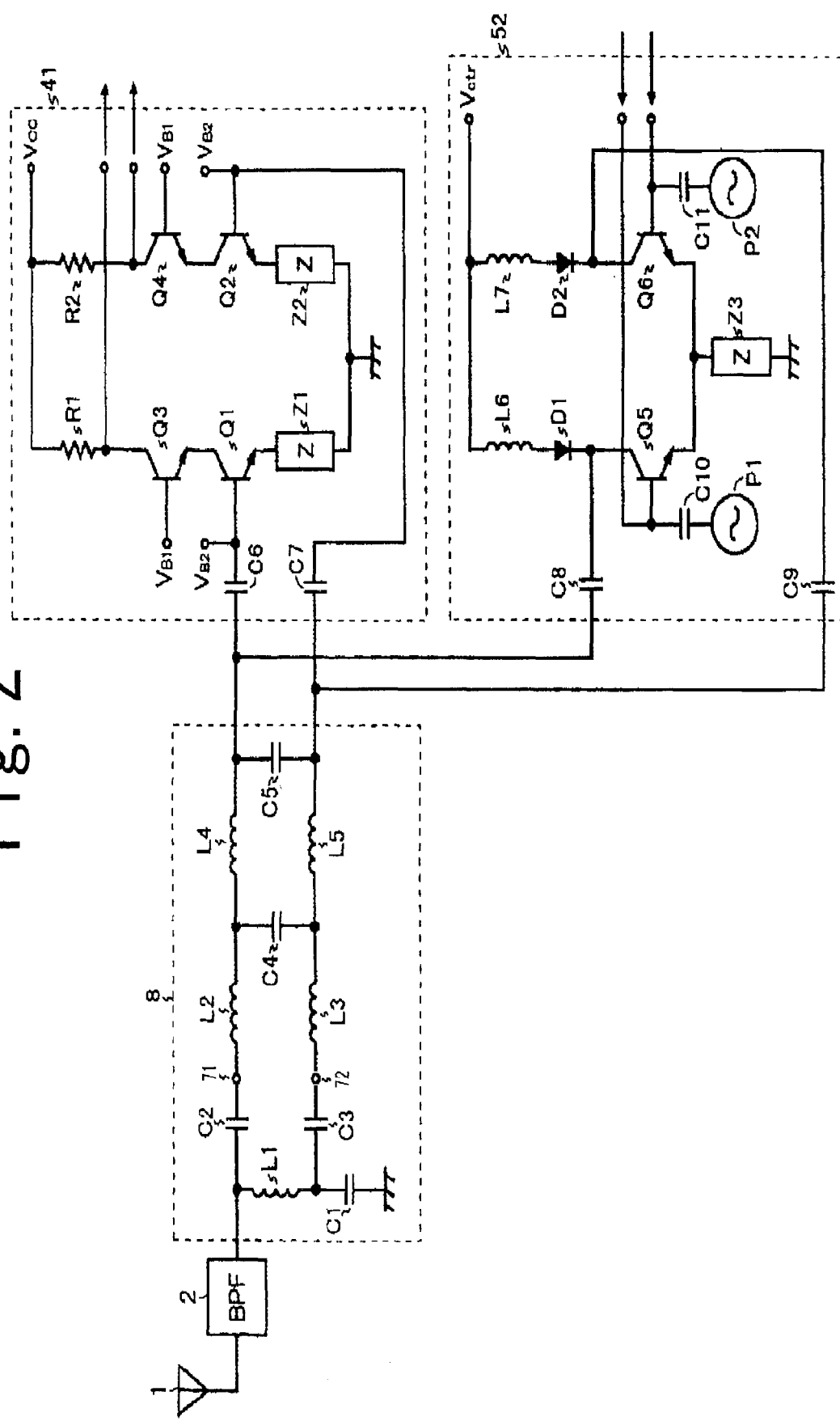
FIG. 2 shows the constitution of the balun, the low noise amplifier, and the variable gain power amplifier of the high frequency signal transceiver apparatus of FIG. 1.

The constitution of the balun in the transceiver apparatus according to the present embodiment and the constitution of the low noise amplifier 41 and the variable gain power amplifier 52 are shown in FIG. 2. The same reference symbols have been assigned to those components which are the same as those in FIG. 1, and a description thereof is therefore omitted here.

First, the constitution of the balun 8 will be described. The balun 8 comprises capacitors C1 to C5 and inductors L1 to L5. The capacitors C1,C2 and C3 are external capacitor elements. The capacitor C4 is a capacitor element formed by the package frame and bonding wires. The capacitor C5 is a capacitor provided by the metal patterns in the semiconductor chip between the bonding wires and the connecting nodes that connects the low noise amplifier 41 and the variable gain power amplifier 52.

The inductor L1 is an external inductor element. The inductors L2 and L3 are inductor elements formed by the package frame. The inductors L4 and L5 are inductor elements formed by bonding wire.

The balun 8 is made of the internal part and the external part.

The external part of the balun comprises external capacitors C1, C2 and C3, and an external inductor L1.

The internal part of the balun is formed by inductors, L2, L3, L4 and L5, and capacitors C4 and C5. The inductors, L2, L3, L4 and L5 and capacitor C4 are what the package frame and bonding wires have in themselves. Therefore, there is no need to attach these inductors and capacitors as other necessary part.

In the high frequency signal transceiver apparatus according to the present embodiment, the inductance value of the bonding wire is substantially 2.2 nH, and the inductance value of the package frame is substantially 1 nH. There are barely any errors due to manufacturing variations in the inductance value of the bonding wire.

The band pass filter 2 is connected to the connecting node that connects the capacitor C2 and the inductor L1. Further, the band pass filter 2 is connected to the connecting node that connects the capacitor C6 in the low noise amplifier 41 and the capacitor C8 in the variable gain power amplifier 52, via the capacitor C2, the inductor L2, and the inductor L4. Further, the band pass filter 2 is connected, via the inductor L1, the capacitor C3, the inductor L3, and the inductor L5, to the connecting node that connects the capacitor C7 in the low noise amplifier 41 and the capacitor C9 in the variable gain power amplifier 52.

The connecting node that connects the inductor L1 and the capacitor C3 is connected to ground via the capacitor Cl. Further, the connecting node that connects the inductor L2 and the inductor L4 is connected via the capacitor C4 to the connecting node that connects the inductor L3 and the inductor L5. In addition, the connecting node that connects the inductor L4 and the capacitor C6 in the low noise amplifier 41 (and the capacitor C8 in the variable gain power amplifier 52) is connected via the capacitor C5 to the connecting node that connects the inductor L5 and the capacitor C7 in the low noise amplifier 41 (and the capacitor C9 in the variable gain power amplifier 52).

The balun 8 functions as a transformer circuit for the unbalanced circuit (the antenna 1 and the band pass filter 2) and the balanced circuits (the low noise amplifier 41 and the variable gain power amplifier 52), and regulates the input impedance of the low noise amplifier 41 and the output impedance of the variable gain power amplifier 52.

Next, a description will be provided for the constitution of the low noise amplifier 41. The low noise amplifier 41 is a balanced cascode amplifier. The connecting node that connects the inductor L4 and the capacitor C5 is connected to the base of an NPN-type transistor Q1 via the capacitor C6, and the connecting node that connects the inductor L5 and the capacitor C5 is connected to the base of an NPN-type transistor Q2 via the capacitor C7. A predetermined bias voltage $V_{B2}$ is applied to the respective base of the transistors Q1 and Q2.

The collector of the transistor Q1 is connected to a terminal which supplies a fixed voltage $V_{CC}$, via a resistor R1 and an NPN-type transistor Q3 which is cascode-connected to the transistor Q1. The collector of the transistor Q2 is connected to the terminal supplying the fixed voltage $V_{CC}$, via a resistor R2 and an NPN-type transistor Q4 which is cascode-connected to the transistor Q2. A predetermined bias voltage $V_{B1}$ is applied to the respective base of the transistors Q3 and Q4.

Also, the emitter of the transistor Q1 is connected to ground via an impedance element Z1 and the emitter of the transistor Q2 is connected to ground via an impedance element Z2. Further, the connecting node that connects the transistor Q3 and the resistor R1, and the connecting node that connects the transistor Q4 and the resistor R2 are connected to the image rejection mixer 42 (see FIG. 1).

The high frequency signal transceiver apparatus according to the present embodiment stops feeding to the receiver circuit section 4 (see FIG. 1) during transmission, thereby rendering the receiver circuit section 4 inoperable. The low noise amplifier 41 is a cascode amplifier, and therefore, during transmission, the resistor R1 exerts no influence on the antenna 1 via the base-collector capacitance of the transistor Q1. As a result, the receiver circuit section 4 is rendered inoperable during transmission and the real part of the output impedance of the variable gain power amplifier 52 as seen by the antenna 1 is easily 50Ω. Therefore, impedance matching with the antenna 1 whose input impedance real part is 50Ω becomes straightforward.

A description will be provided next for the variable gain power amplifier 52. The variable gain power amplifier 52 is a balanced amplifier constituted comprising a diode and an inductor as power feed elements. This inductor is formed by the spiral pattern of the metal layer in the semiconductor chip. The I/Q quadrature modulator 51 (see FIG. 1) is connected to the respective base of NPN-type transistors Q5 and Q6. The base of the transistor Q5 is connected to an AC voltage source P1 via a capacitor C10, and the base of the transistor Q6 is connected to an AC voltage source P2 via a capacitor C11.

The collector of the transistor Q5 is connected to the cathode of a diode D1, and the collector of the transistor Q6 is connected to the cathode of a diode D2. The anode of the diode D1 is connected via an inductor L6 to a terminal which supplies a control voltage $V_{ctr}$. The anode of the diode D2 is connected via an inductor L7 to the terminal supplying the control voltage $V_{ctr}$.

Further, the connecting node that connects the diode D1 and the transistor Q5 is connected to the connecting node that connects the inductor L4 and the capacitor C5, via the capacitor C8, and the connecting node that connects the diode D2 and the transistor Q6 is connected to the connecting node that connects the inductor L5 and the capacitor C5, via the capacitor C9.

The high frequency signal transceiver apparatus according to the present embodiment stops feeding to the transmitter circuit section 5 during reception, thereby rendering the transmitter circuit section 5 inoperable. In this embodiment, the variable gain power amplifier 52 is rendered as a balanced amplifier constituted comprising a diode and an inductor as power feed elements, and therefore, during reception, a resistance component in the variable gain power amplifier 52 exerts no influence on the antenna 1. As a result, the transmitter circuit section 5 is rendered inoperable during reception and the real part of the input impedance of the low noise amplifier 41 is easily accomplished to be 50Ω.

Therefore, impedance matching with the antenna 1 whose output impedance real part is 50Ω becomes straightforward.

Further, because the receiver circuit section 4 and the transmitter circuit section 5 are constituted as balance circuits, it is possible to use differentiation to cancel out internal digital noise and the like which is superposed on transmitted and received signals, thereby permitting an improvement in the accuracy of the transmitter and receiver operations.

Furthermore, a decrease in the frequency of the transmitted and received signals is accompanied by the need to enlarge the components which form the balun, which in turn makes miniaturization of the transceiver apparatus problematic. Therefore, the high frequency signals which are transmitted and received by the high frequency signal transceiver apparatus according to the present invention are desirably in or above the GHz band. In the description above, the inductors L4 and L5 were described only as bonding wire inductor elements but a similar balun can also be formed by wiring, using inductor elements produced by solder bump or another connection method, so as to obtain an appropriate inductor value.

In addition, the high frequency signal transceiver apparatus according to the present invention can be applied to a Bluetooth-adapted device such as a cellular phone, computer, or AV machine, for example.

What is claimed is:

1. A transceiver apparatus, comprising:
a semiconductor integrated circuit device that mounts on the same semiconductor chip a balanced receiver circuit for receiving a received signal as a differential input and a balanced transmitter circuit for outputting a transmitted signal as a differential output, and that has at least two terminals connected to connecting nodes that connect the balanced receiver circuit and the balanced transmitter circuit;
first and second capacitors connected to the terminals respectively;
an external inductor connected to the first and second capacitors;
a band pass filter and an antenna coupled to the first capacitor;
and a third capacitor connected to the second capacitor.

2. The transceiver apparatus as claimed in claim 1, wherein a low noise amplifier for receiving a received signal as a differential input and which is provided in the balanced receiver circuit is a cascode amplifier.

3. The transceiver apparatus as claimed in claim 1, wherein a power amplifier for outputting a transmitted as a differential output and which is provided in the balanced transmitter circuit is an amplifier whose power feed elements are an inductor and a diode.

4. The transceiver apparatus as claimed in claim 2, wherein a power amplifier for outputting a transmitted as a differential output and which is provided in the balanced transmitter circuit is an amplifier whose power feed elements are an inductor and a diode.

* * * * *